United States Patent
Kim et al.

(10) Patent No.: US 8,854,440 B2
(45) Date of Patent: Oct. 7, 2014

(54) THREE DIMENSIONAL IMAGE DISPLAY DEVICE AND A METHOD OF DRIVING THE SAME

(75) Inventors: Bo-Ram Kim, Asan-si (KR); Seung Hwan Moon, Asan-si (KR); Byoung Jun Lee, Asan-si (KR); Jae-Hoon Lee, Seoul (KR); Yun-Jae Kim, Seoul (KR); Nam-Hee Goo, Asan-si (KR); Myoung-Chul Kim, Suwon-si (KR); Jae Ho Choi, Seongnam-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 273 days.

(21) Appl. No.: 13/197,289

(22) Filed: Aug. 3, 2011

(65) Prior Publication Data

US 2012/0256903 A1   Oct. 11, 2012

(30) Foreign Application Priority Data

Apr. 6, 2011  (KR) .................. 10-2011-0031755

(51) Int. Cl.
*G06T 15/00* (2011.01)
*H04N 13/04* (2006.01)

(52) U.S. Cl.
CPC .............................. *H04N 13/0497* (2013.01); *H04N 13/0438* (2013.01)
USPC ........................................... 348/55; 345/419

(58) Field of Classification Search
CPC .................................. H04N 13/0438
USPC .......................................... 348/55; 345/419
See application file for complete search history.

(56) References Cited

U.S. PATENT DOCUMENTS

| | | | |
|---|---|---|---|
| 6,448,952 B1 * | 9/2002 | Toyoda et al. | 345/97 |
| 7,019,725 B1 * | 3/2006 | Lee et al. | 345/98 |
| 7,126,573 B2 | 10/2006 | Park et al. | |
| 7,310,118 B2 | 12/2007 | Kamimura | |
| 7,518,583 B2 | 4/2009 | Lee et al. | |
| 2006/0125715 A1 | 6/2006 | Choi | |
| 2006/0170641 A1 * | 8/2006 | Song et al. | 345/98 |
| 2007/0035493 A1 * | 2/2007 | Chang | 345/87 |
| 2007/0070011 A1 | 3/2007 | Tang | |
| 2009/0046084 A1 * | 2/2009 | Lim | 345/205 |
| 2009/0051837 A1 * | 2/2009 | Xiao | 349/36 |
| 2009/0167659 A1 | 7/2009 | Kim et al. | |
| 2009/0237495 A1 * | 9/2009 | Kawahara | 348/56 |
| 2010/0177254 A1 * | 7/2010 | MacNaughton et al. | 349/15 |
| 2011/0122237 A1 * | 5/2011 | Hong | 348/56 |
| 2011/0292309 A1 * | 12/2011 | Lin et al. | 349/15 |

FOREIGN PATENT DOCUMENTS

| | | |
|---|---|---|
| JP | 2002-140046 | 5/2002 |
| JP | 2008-181157 | 8/2008 |
| JP | 2009-237580 | 10/2009 |
| KR | 1020050077850 | 8/2005 |

(Continued)

*Primary Examiner* — Christopher S Kelley
*Assistant Examiner* — Matthew Kwan
(74) *Attorney, Agent, or Firm* — F. Chau & Associates, LLC (57) ABSTRACT

A three dimensional image display device, including: a display panel that alternately displays a left eye image and a right eye image, wherein a common voltage synchronized with a voltage reset signal is applied to the display panel and the voltage reset signal is maintained at a high level for a predetermined time before the voltage reset signal is input to the left eye image or the right eye image.

15 Claims, 7 Drawing Sheets

(56) References Cited

FOREIGN PATENT DOCUMENTS

| KR | 10-0577300 | 4/2006 |
| KR | 10-0685825 | 2/2007 |
| KR | 10-0707439 | 4/2007 |
| KR | 1020070121283 | 12/2007 |

* cited by examiner

THREE DIMENSIONAL IMAGE DISPLAY DEVICE AND A METHOD OF DRIVING THE SAME

CROSS-REFERENCE TO RELATED APPLICATION

This application claims priority under 35 U.S.C. §119 to Korean Patent Application No. 10-2011-0031755 filed in the Korean Intellectual Property Office on Apr. 6, 2011, the disclosure of which is incorporated by reference herein in its entirety.

BACKGROUND

1. Technical Field

The present invention relates to a three dimensional (3D) image display device and a method of driving the same.

2. Discussion of the Related Art

In general, a 3D image display technique allows a viewer to feel the depth (e.g., a 3D effect) of an object by using binocular parallax.

Binocular parallax may exist due to the eyes of a person being spaced apart from each other by a predetermined distance, and thus, a two dimensional (2D) image seen in the left eye is different from that seen in the right eye. Thus, the person's brain blends the two different 2D images together to generate a 3D image that is a perspective and realistic representation of the object being viewed.

Techniques for displaying 3D images, which use the binocular parallax, may be classified into a stereoscopic method and an autostereoscopic method. The stereoscopic method uses shutter glasses or polarized glasses and the autostereoscopic method does not use glasses, but instead arranges a lenticular lens and a parallax barrier in a display panel.

In the stereoscopic shutter glass method, an image to be seen in the left eye and an image to be seen in the right eye image are separately and continuously output from a display panel to a pair of shutter glasses and the left eye shutter and the right eye shutter of the shutter glass are selectively opened and closed, thereby displaying 3D images. However, shutter glasses are impacted by crosstalk. This refers to the ghosting of images when the right eye sees some residue of the image intended for the left eye and vice versa. Accordingly, there is a need to reduce crosstalk in shutter glasses.

SUMMARY

An exemplary embodiment of the present invention provides a three dimensional image display device, including: a display panel that alternately displays a left eye image and a right eye image, wherein a common voltage synchronized with a voltage reset signal is applied to the display panel and the voltage reset signal is maintained at a high level for a predetermined time before the left eye image or the right eye image is input.

The common voltage may be a reference common voltage, a first voltage in which a reset voltage is added to the reference common voltage, or a second voltage in which the reset voltage is subtracted from the reference common voltage.

The first voltage or the second voltage as the common voltage may be maintained at a high level while the voltage reset signal is maintained at a high level.

A gate-on voltage may be applied to a plurality of gate lines based on at least one of the voltage reset signal and a gate reset signal.

The gate-on voltage may be simultaneously applied to the plurality of gate lines while at least one of the voltage reset signal and the gate reset signal is maintained at a high level.

The gate-on voltage may be sequentially applied to the plurality of gate lines while at least one of the voltage reset signal and the gate reset signal is maintained at a low level.

A left eye shutter may maintain an open state from a time when an input of the left eye image starts to a time when an application of a first pulse of the voltage reset signal starts and a right eye shutter may maintain an open state from a time when an input of the right eye image starts to a time when an application of a second pulse of the voltage reset signal starts, based on a 3D sync signal.

The right eye shutter may maintain a closed state from a time when an application of a third pulse of the voltage reset signal starts to a time when an application of a first pulse of the voltage reset signal ends and the left eye shutter may maintain a closed state from a time when an application of the first pulse of the voltage reset signal starts to a time when an application of a second pulse of the voltage reset signal ends, based on the 3D sync signal.

The three dimensional image display device may further include a backlight unit, wherein the backlight unit may be turned-on from a time when an input of the left eye image starts to a time when an application of a first pulse of the voltage reset signal starts, and the backlight unit may be turned-on from a time when an input of the right eye image starts to a time when an application of the second pulse of the voltage reset signal starts.

The backlight unit may be turned-off for a time when the voltage reset signal is maintained at a high level.

The display panel displays black for a predetermined time.

The predetermined time may be about 0.5 ms or less.

The three dimensional image display device may further include: a common voltage switching unit that switches the common voltage based on the voltage reset signal.

The three dimensional image display device may further include a gate-on voltage switching unit that applies a gate-on voltage to a plurality of gate lines based on at least one of the voltage reset signal and a gate reset signal.

The gate-on voltage switching unit may include a first output terminal and a second output terminal and the first output terminal may be connected to the plurality of gate lines and the second output terminal may be connected to a gate driver.

Another exemplary embodiment of the present invention provides a method of driving a three dimensional display device, the method including: alternately displaying a left eye image and a right eye image in a display panel; and applying a common voltage synchronized with a voltage reset signal to the display panel, wherein the voltage reset signal is maintained at a high level for a predetermined time before the left eye image or the right eye image is input.

An exemplary embodiment of the present invention provides, a 3D image display device, including: a display panel that alternately displays a first eye image and a second eye image, wherein after the first eye image is displayed and before the second eye image displayed, a common voltage of a first level may be applied to the display panel for a predetermined time, wherein the first level of the common voltage causes about the entire display panel to display black for the predetermined time.

The first level of the common voltage may be maintained for the predetermined time by a voltage reset signal.

The first level of the common voltage may be changed to a second level by the voltage reset signal immediately before the second eye image is displayed, wherein the second level causes about the entire display panel to stop displaying black.

DETAILED DESCRIPTION OF THE EMBODIMENTS

Exemplary embodiments of the present invention will be described more fully hereinafter with reference to the accompanying drawings.

However, the present invention may be embodied in various different ways and should not be construed as limited to the exemplary embodiments described herein.

Like reference numerals may designate like elements throughout the specification and drawings.

Certain aspects of the drawings may be exaggerated for clarity.

Hereinafter, a three dimensional (3D) image display device according to an exemplary embodiment of the present invention will be described in detail with reference to FIGS. 1 to 3.

Figure 1:
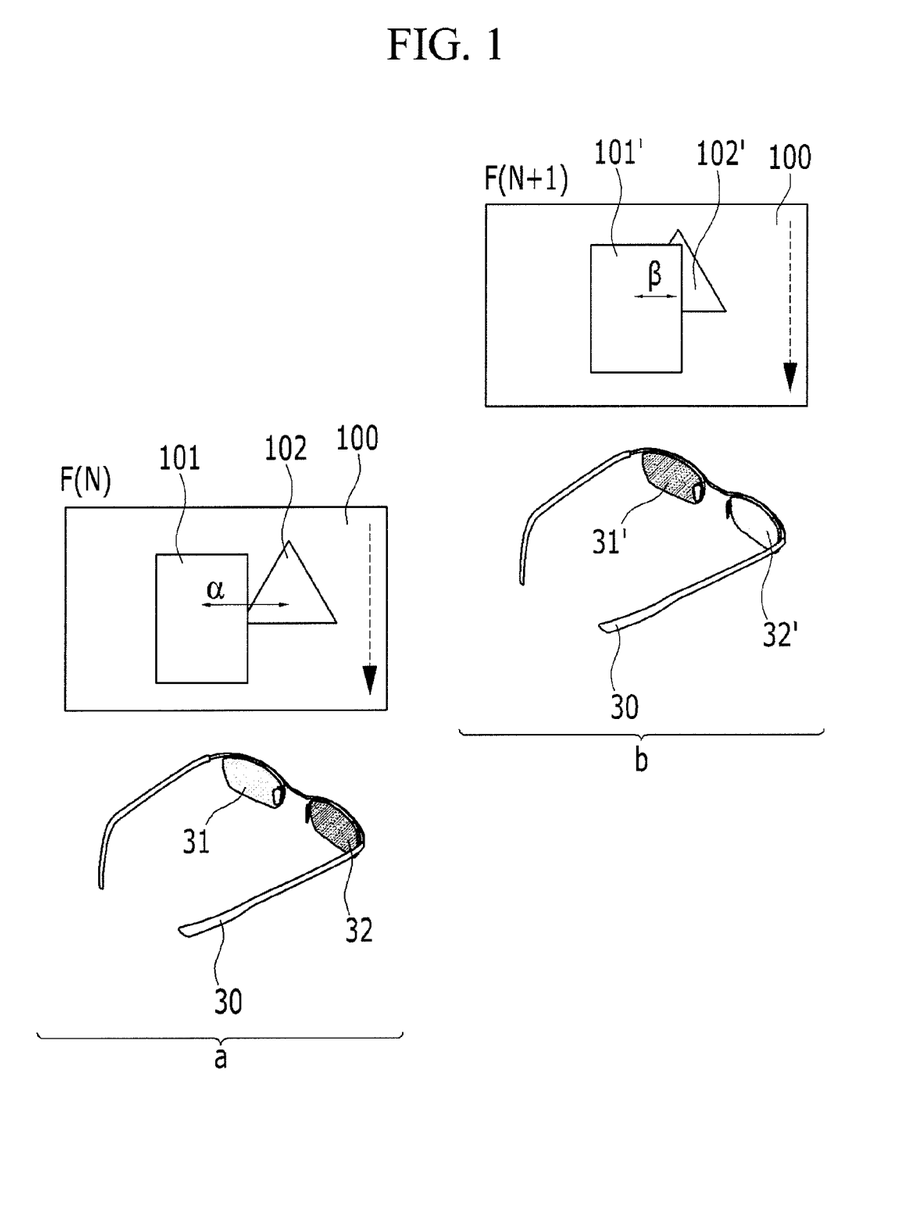
FIG. 1 is a diagram showing an operation of a three dimensional (3D) image display device according to an exemplary embodiment of the present invention.
Figure 2:
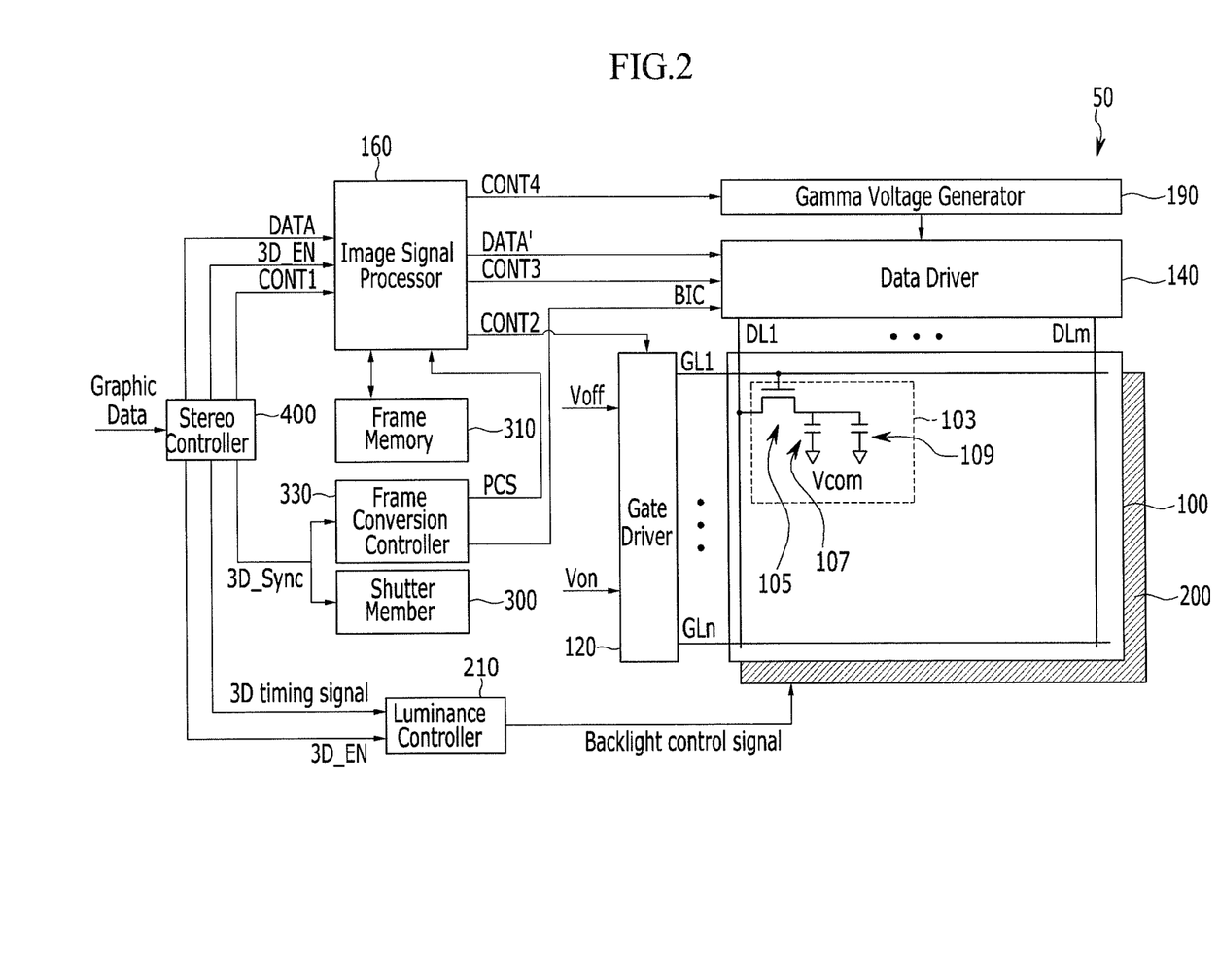
FIG. 2 is a diagram showing a 3D image display device according to an exemplary embodiment of the present invention.
Figure 3:
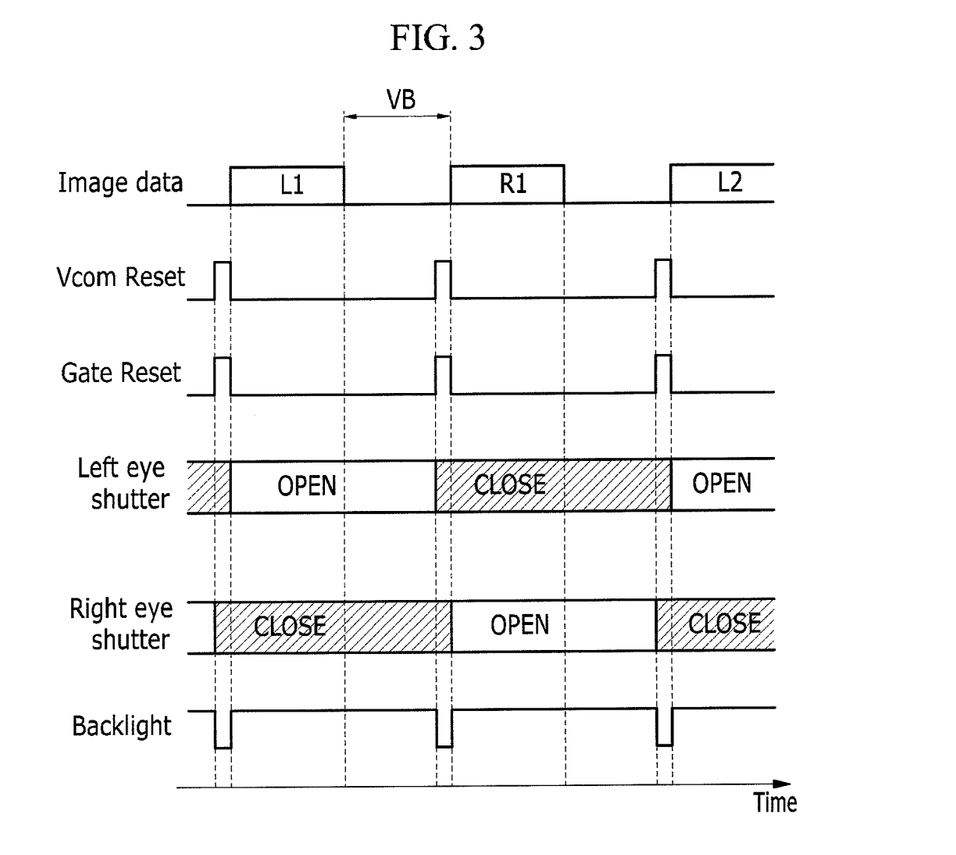
FIG. 3 is a diagram showing an operation timing of a 3D image display device according to an exemplary embodiment of the present invention.

FIG. 1 is a diagram showing an operation of a 3D image display device according to an exemplary embodiment of the present invention, FIG. 2 is a diagram showing a 3D image display device according to an exemplary embodiment of the present invention, and FIG. 3 is a diagram showing an operation timing of a 3D image display device according to an exemplary embodiment of the present invention.

Referring to FIGS. 1 and 2, a shutter member 300 may be a pair of eyeglass-shaped shutter glasses 30, but is not limited thereto and may instead be a pair of mechanical shutter glasses (e.g., goggles).

The shutter glasses 30 have right eye shutters 32 and 32' and left eye shutters 31 and 31' which alternately block light at a predetermined cycle depending on the operation of a display panel 100.

The right eye shutter may be closed 32 or open 32' and the left eye shutter may be open 31 or closed 31'.

For example, the left eye shutter may be closed 31', when the right eye shutter is open 32' during frame F(N+1), and the right eye shutter may be closed 32, when the left eye shutter is open 31 during frame F(N).

Further, the left eye shutter and the right eye shutter may be open at the same time or closed at the same time.

The shutters of the shutter glasses 30 may be formed by the technologies used for making a liquid crystal display, organic light emitting diode display, and electrophoretic display, but are not limited thereto.

For example, the shutters of the shutter glasses 30 may include two transparent conductive layers and a liquid crystal layer therebetween.

A polarization film may be disposed on a surface of the conductive layers.

The liquid crystal substances (e.g., liquid crystal molecules) are rotated by a voltage applied to the shutters, and the shutters may be open or closed due to the rotation.

For example, as shown in FIG. 1(a), when left eye images 101 and 102 are output on the display panel 100, the left eye shutter 31 of the shutter glasses 30 is open to transmit the images 101 and 102 to the left eye, and the right eye shutter 32 of the shutter glasses 30 is closed to block the images 101 and 102 from the right eye.

Further, as shown in FIG. 1(b), when right eye images 101' and 102' are output on the display panel 100, the right eye shutter 32' of the shutter glasses 30 is open to transmit the images 101' and 102' to the right eye, and the left eye shutter 31' of the shutter glasses 30 is closed to block the images 101' and 102' from the left eye.

Therefore, the left eye image is seen by only the left eye for a predetermined time and then the right eye image is seen by only the right eye for a predetermined time, such that an image having depth perception (e.g., a 3D image) is seen due to a difference between the left eye image and the right eye image.

The image seen by the left eye is an image in which the quadrangle of the left eye image 101 and the triangle of the left eye image 102 are separated by a distance α from each other.

The image seen by the right eye is an image in which the quadrangle of the right eye image 101' and the triangle of the right eye image 102' are separated by a distance β from each other.

The α and β may have different values from each other.

When the distances between the images seen by the left and right eyes are different from each other, as described above, the quadrangles appear closer to the wearer of the shutter glasses 30 and the triangles appear behind the quadrangles to the wearer of the shutter glasses 30, thereby giving depth to these objects.

It is possible to adjust the distance (and consequently the perceived depth) between two objects spaced apart from each other, by adjusting the distances α and β between the quadrangles and the triangles.

Referring to FIG. 1, the direction of the arrows shown in the display panel 100 shows the order in which a gate-on voltage Von is applied to a plurality of gate lines extending substantially in the row direction across the display panel 100.

In other words, the gate-on signal Von may be sequentially applied from the upper gate line to the lower gate line in the display panel 100.

For example, the display panel 100 may display the left eye images 101 and 102, as follows.

The gate-on voltage Von is sequentially applied from the upper row of the gate lines to the lower row of the gate lines such that, for a gate line row receiving the gate-on voltage Von, a data voltage is applied to pixel electrodes of that row through thin film transistors connected to that gate line.

The applied data voltage is a data voltage for displaying the left eye images 101 and 102 (which may hereinafter be, referred to as "left eye data voltage") and the applied left eye data voltage may be kept for a predetermined time by a storage capacitor in individual pixels.

Further, similarly, a data voltage for displaying the right eye images 101' and 102' (which may hereinafter be, referred to as "right eye data voltage") is then applied so that the display panel 100 may display the right eye images 101' and 102' and the data voltage may be kept for a predetermined time by a storage capacitor in individual pixels.

Referring to FIG. 2, the display panel 100 is a liquid crystal display.

The display panel 100 may include an upper substrate, a lower substrate, and a liquid crystal layer injected between the upper substrate and the lower substrate.

The display panel 100 displays an image by changing the alignment direction of liquid crystal molecules in the liquid crystal layer, by an electric field generated between two electrodes formed on the upper and lower substrates, respectively, to adjust polarization of light.

Gate lines GL1-GLn, data lines DL1-DLm, pixel electrodes, and thin film transistors 105 connected to the gate lines GL1-GLn and the data lines DL1-DLm are disposed on the lower substrate.

The thin film transistors 105 respectively control voltage applied to the pixel electrodes on the basis of signals supplied to the gate lines GL1-GLn and the data lines DL1-DLm. The pixel electrodes may be transflective pixel electrodes with a transmissive region and a reflective region.

Further, storage capacitors 107 may be formed to keep the voltage applied to the pixel electrodes for a predetermined time.

For example, one pixel 103 may include the thin film transistor 105, the storage capacitor 107, and a liquid crystal capacitor 109.

A black matrix, a color filter, and a common electrode may be disposed on the upper substrate opposite to the lower substrate.

A common voltage Vcom is applied to the common electrode.

Further, at least one of the color filter, the black matrix, and the common electrode formed on the upper substrate may be formed on the lower substrate, and when the common electrode and the pixel electrode are formed on the lower substrate, at least one of the common electrode and the pixel electrode may be a linear electrode.

The liquid crystal layer may include a liquid crystal of a twisted nematic (TN) mode, a liquid crystal of a vertically aligned (VA) mode, and a liquid crystal of an electrically controlled birefringence (ECB) mode.

A polarizer is attached to the outer surface of the upper substrate and the outer surface of the lower substrate, respectively.

Further, a compensation film may be disposed between the outer substrate and the polarizer and between the inner substrate and the polarizer.

A backlight unit 200 includes a light source, and for example, the light source is a fluorescent lamp, such as a cold cathode fluorescent lamp (CCFL), or a light emitting diode (LED).

Further, the backlight unit 200 may include a reflector, a light guide, and a luminance improving film.

Referring to FIG. 2, a display apparatus 50 may include the display panel 100, the backlight unit 200, a data driver 140, a gate driver 120, an image signal processor 160, a gamma voltage generator 190, a luminance controller 210, the shutter member 300, a frame memory 310, a frame conversion controller 330, and a stereo controller 400.

The stereo controller 400 may transmit a 3D timing signal and 3D enable signal 3D_En to the luminance controller 210.

The luminance controller 210 may transmit a backlight control signal to the backlight unit 200 in response to the 3D timing signal and the 3D enable signal 3D_En.

The backlight unit 200 may be turned on/off by the backlight control signal from the luminance controller 210.

The backlight control signal transmitted to the backlight unit 200 may keep the backlight unit 200 turned on for a predetermined time. The backlight control signal may also turn off the backlight unit 200.

The stereo controller 400 may transmit a 3D sync signal 3D_sync to the shutter member 300 and the frame conversion controller 330.

The shutter member 300 may be electrically connected with the stereo controller 400.

The shutter member 300 may receive the 3D sync signal 3D_sync by wireless infrared communication or by a wired connection.

The shutter member 300 may operate in response to the 3D sync signal 3D_sync or a transformed 3D sync signal.

The 3D sync signal 3D_sync may include all the signals that are used to open/close the left eye shutter or the right eye shutter of the shutter member 300.

The frame conversion controller 330 may transmit control signals PCS and BIC to the image signal processor 160 and the data driver 140, respectively.

The stereo controller 400 may receive graphic data and transmit display data DATA in response thereto. The stereo controller 400 may also transmit the 3D enable signal 3D_En, and other control signals CONT1 to the image signal processor 160.

The image signal processor 160 may transmit various types of display data DATA' and various types of control signals CONT2, CONT3, and CONT4 to the display panel 100, through the gate driver 120, the data driver 140, and the gamma voltage generator 190, to display an image on the display panel 100. The gate driver 120 receives the gate-on voltage Von and a gate-off voltage Voff.

The display data DATA may include left eye image data and right eye image data, or the like, in the 3D image display device. The display data DATA may include data suitable for two-dimensional (2D) image viewing when the 3D mode of the 3D image display device is not active.

As an example of the signal waveform of the 3D image display device, referring to FIG. 3, left eye image data L1 and L2 and right eye image data R1 are input to the display panel 100.

In this case, the left eye and right eye image data L1, L2 and R2 may be a signal represented in digital or analog fashion to effectuate the output of an image (e.g., video or picture) from the display panel 100.

There is a time, when for example, after all the left eye image data L1 have been input and before the right eye image data R1 are input or after all the right eye image data R1 have been input and before the left eye image data L2 are input; this time is referred to as a vertical blank (VB) interval. For example, the VB interval may be about 10% to about 60% of one frame, but is not limited thereto.

A voltage reset signal Vcom Reset is applied before the left eye image data L1, the right eye image data R1 or the left eye image data L2 is input to the display panel 100.

For example, the voltage reset signal Vcom Reset may be applied immediately before the left eye image data L1, the right eye image data R1, or the left eye image data L2 is input to the display panel 100.

Figure 4:
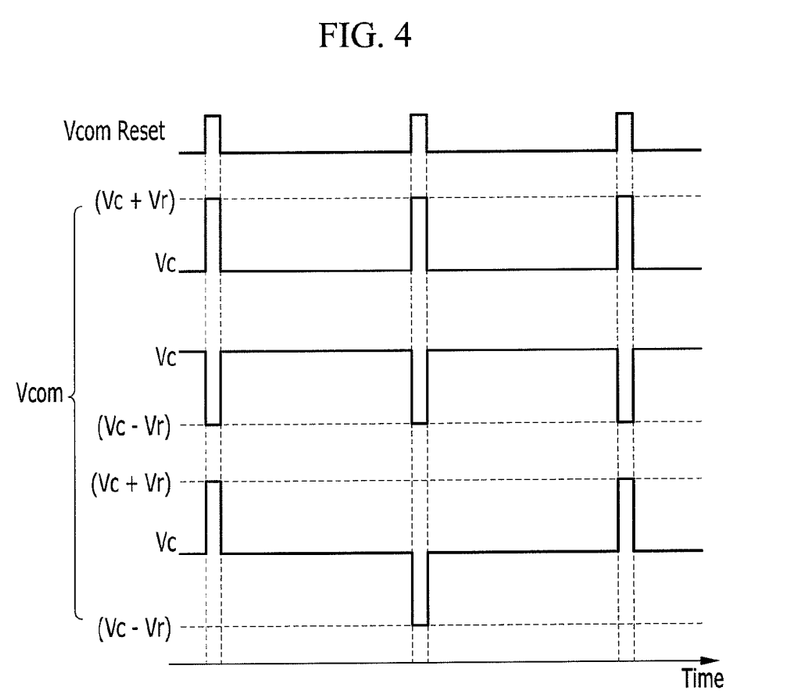
FIG. 4 is a diagram showing a method of applying a common voltage in a 3D image display device according to an exemplary embodiment of the present invention.

Referring to FIG. 4, the common voltage Vcom applied to the display panel 100 is synchronized with the voltage reset signal Vcom Reset. For example, while the voltage reset signal Vcom Reset is at a high level, the common voltage Vcom may be Vc+Vr or Vc−Vr.

Herein, Vc+Vr and Vc−Vr are high voltages that may change all the gray values of the plurality of pixels 103 of the display panel 100 into black. It is noted, however, that these voltages could be changed to change all the gray values of the plurality of pixels 103 of the display panel 100 into white.

While the voltage reset signal Vcom Reset is at a low level, the common voltage Vcom is Vc.

Vc is referred to as a reference common voltage and Vr is referred to as a reset voltage.

Vc+Vr may be applied, Vc−Vr may be applied, or Vc+Vr and Vc−Vr may be alternately applied while the common voltage Vcom is synchronized with the voltage reset signal Vcom Reset.

When Vc+Vr or Vc−Vr is applied to the display panel 100 as the common voltage Vcom, the display panel 100 displays black for a period in which Vc+Vr or Vc−Vr is applied, thereby reducing a crosstalk phenomenon between the left eye image and the right eye image.

For example, during the VB interval shown in FIG. 3, before the left eye image data L1 or the right eye image data R1 is input, the black image is displayed on the entire screen of the display panel 100, thereby reducing the crosstalk phenomenon between the left eye image and the right eye image.

For example, in the 3D image display device, according to an exemplary embodiment of the present invention, which may have a frame frequency of 120 Hz in which the left eye image of 60 Hz is output and the right eye image of 60 Hz is output, the black image may be displayed on the entire screen of the display panel 100.

Figure 5:
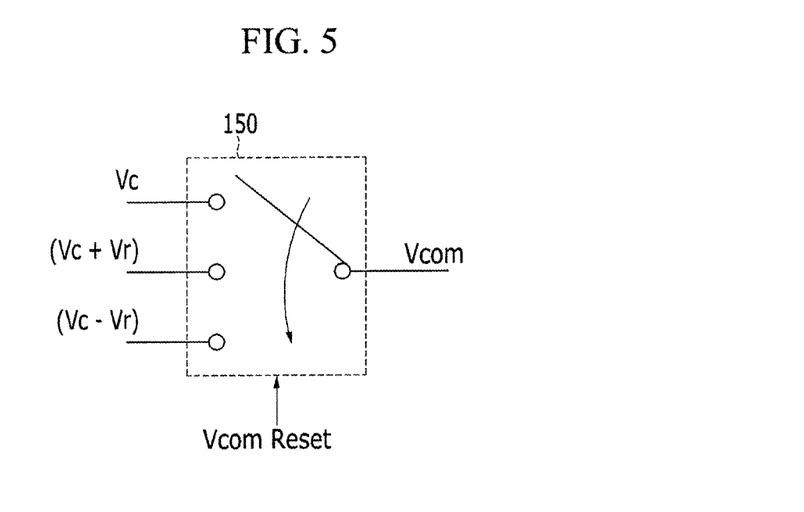
FIG. 5 is a diagram showing a circuit unit for applying a common voltage in a 3D image display device according to an exemplary embodiment of the present invention.

Referring to FIG. 5, a circuit unit for applying the common voltage Vcom may include a common voltage switching unit 150 that switches the common voltage Vcom by the voltage reset signal Vcom Reset.

The common voltage switching unit 150 applies Vc, Vc+Vr, or Vc−Vr as the common voltage Vcom, based on the voltage reset signal Vcom Reset.

For example, while the voltage reset signal Vcom Reset is at a high level, Vc+Vr or Vc−Vr may be applied as the common voltage Vcom and while the voltage reset signal Vcom Reset is at a low level, Vc may be applied as the common voltage Vcom.

Referring back to FIG. 3, the left eye shutter may be in a closed state CLOSE when a first voltage reset signal Vcom Reset of a high level is applied just before the left image data L1 is input. The left eye shutter may be in an open state OPEN when the left eye image data L1 is input. The left eye shutter may remain in the open state OPEN until a second voltage reset signal Vcom Reset of a high level is applied just before the right eye image data R1 is input. When the second voltage reset signal Vcom Reset of a high level is applied the left eye shutter goes into the closed state CLOSE.

In addition, the left eye shutter may remain in the closed state CLOSE until a third voltage reset signal Vcom Reset of a high level goes low just before the left eye image data L2 is input, at which time the left eye shutter goes back to the open state OPEN.

The right eye shutter may be in a closed state CLOSE when the first voltage reset signal Vcom Reset of a high level is applied just before the left eye image data L1 is input.

The right eye shutter may remain in the closed state CLOSE while the left eye image data L1 is input and while the second voltage reset signal Vcom Reset of a high level is input just before the right eye image data R1 is input. The right eye shutter may be in an open state OPEN when the right eye image data R1 is input and may remain in the open state OPEN until the third voltage reset signal Vcom Reset of a high level is input just before the left image data L2 is input.

At this time, the right eye shutter may go into a closed state CLOSE and may remain there while the left eye image data L2 is input.

Consequently, since the left eye shutter or the right eye shutter is open for about 1 frame, the luminance of the 3D display device, according to an exemplary embodiment of the present invention, seen through the shutter member 300 may be increased.

When the display panel 100 includes the backlight unit 200, the backlight unit 200 may be turned-on between the consecutive voltage reset signals Vcom Reset of a high level and the luminance of the 3D display device may be increased since the turn-on time of the backlight unit 200 is increased.

For example, the backlight unit 200 may be turned-on from the time when the voltage reset signal Vcom Reset is changed from a high level to a low level to the time when the voltage reset signal Vcom Reset is changed from a low level to a high level.

Figure 6:
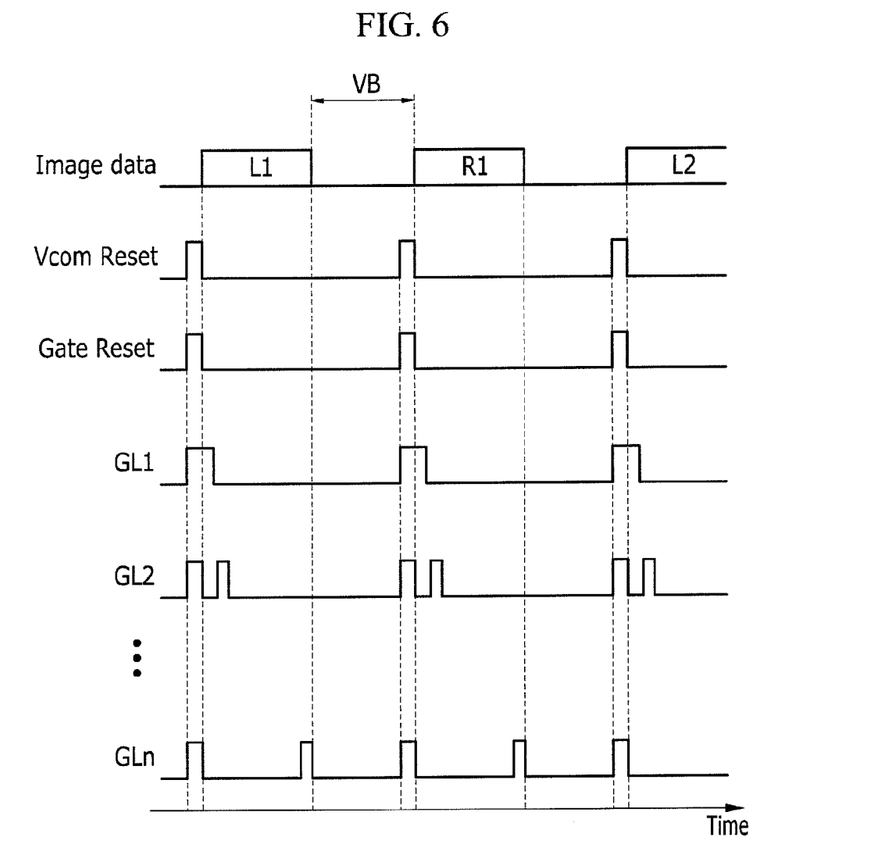
FIG. 6 is a diagram showing a method of applying a gate-on voltage in a 3D image display device according to an exemplary embodiment of the present invention.

The gate-on voltage Von may be applied to a plurality of gate lines GL1 to GLn, based on at least one of the voltage reset signal Vcom Reset and a gate reset signal Gate Reset.

For example, the gate-on voltage Von may be applied to the plurality of gate lines GL1 to GLn while at least one of the voltage reset signal Vcom Reset and the gate reset signal Gate Reset is maintained at a high level.

In addition, the gate-on voltage Von may be sequentially applied to the plurality of gate lines GL1 to GLn while at least one of the voltage reset signal Vcom Reset and the gate reset signal Gate Reset is maintained at a low level.

The gate reset signal Gate Reset for simultaneously applying the gate-on voltage Von to the plurality of gate lines GL1 to GLn may be synchronized with the voltage reset signal Vcom Reset.

For example, referring to FIG. 6, while the voltage reset signal Vcom Reset is at a high level, the gate reset signal Gate Reset may be at a high level.

The gate-on voltage Von may be almost simultaneously applied to the plurality of gate lines GL1 to GLn while the gate reset signal Gate Reset is at a high level, such that the plurality of pixel rows of the 3D image display device, according to an exemplary embodiment of the present invention, may almost simultaneously display black.

The gate-on voltage Von may be sequentially applied to the plurality of gate lines GL1 to GLn from when the gate reset signal Gate Reset is changed from a high level to a low level.

In addition, the gate reset signal Gate Reset may be omitted. In this case, the voltage reset signal Vcom Reset may be used instead of the gate reset signal Gate Reset.

Figure 7:
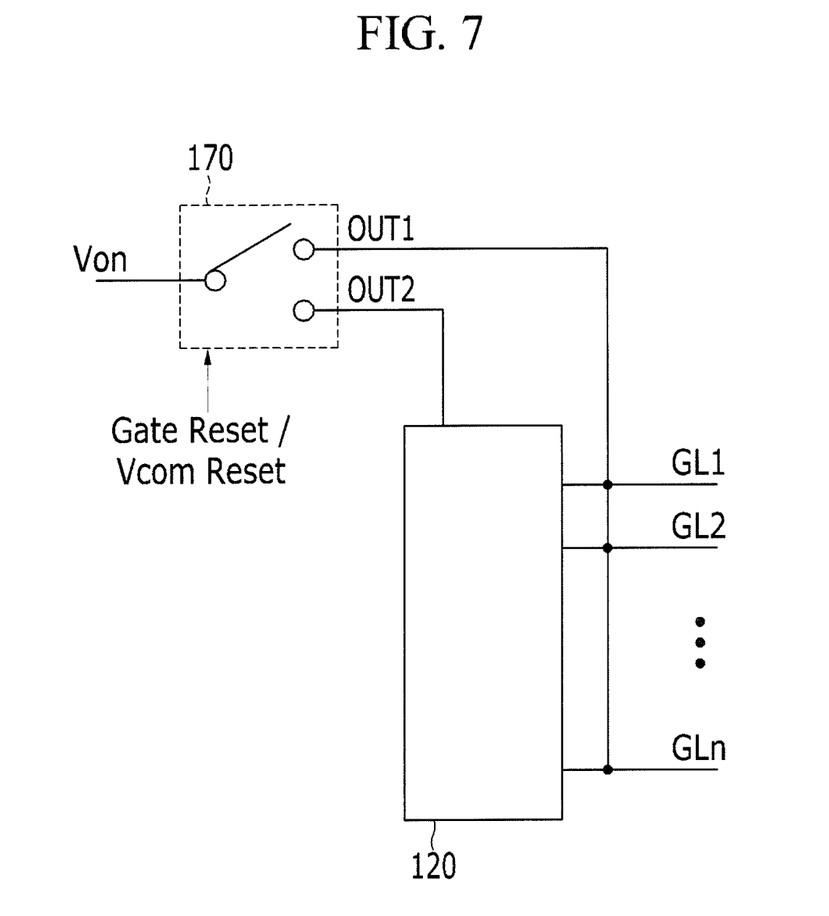
FIG. 7 is a diagram showing a circuit unit for applying a gate-on voltage in a 3D image display device according to an exemplary embodiment of the present invention.

Referring to FIG. 7, a circuit unit for applying the gate-on voltage Von may include a gate-on voltage switching unit 170 that switches the gate-on voltage Von by the gate reset signal Gate Reset.

The gate-on voltage switching unit 170 includes a first output terminal OUT1 and a second output terminal OUT2, wherein the first output terminal OUT1 is connected to the plurality of gate lines GL1 to GLn and the second output terminal OUT2 is connected to the gate driver 120.

The gate-on voltage switching unit 170 applies the gate-on voltage Von to the gate driver 120 or the plurality of gate lines GL1 to GLn, based on the gate reset signal Gate Reset.

For example, the gate-on voltage Von may be almost simultaneously applied to the plurality of gate lines GL1 to GLn while the gate reset signal Gate Reset is at a high level and the gate-on voltage Von may be applied to the gate driver 120 while the gate reset signal Gate Reset is at a low level.

In addition, the voltage reset signal Vcom Reset may be applied to the gate-on voltage switching unit 170, instead of the gate reset signal Gate Reset. In this case, the gate-on voltage Von may be almost simultaneously applied to the plurality of gate lines GL1 to GLn while the voltage reset signal Vcom Reset is at a high level and the gate-on voltage Von may be applied to the gate driver 120 while the voltage reset signal Vcom Reset is at a low level.

The gate driver 120 may be mounted in the display panel 100 and may include a plurality of stages that are dependently connected with each other.

The stages may receive various control signals CONT2 from the image signal processor 160.

An example of the control signal CONT2 may include a scan start signal, or the like.

In addition, the control signal CONT2 may include a clock signal, a low voltage signal, or the like.

When the display panel 100 is a TN-type liquid crystal display, a response speed of its liquid crystal when going from white-to-black is faster than that when going from black-to-white.

For example, the response speed of the TN-type liquid crystal molecules when going from white-to-black may be about 1 ms or less and the response speed of the TN-type liquid crystal molecules when going from black-to-white may be about 3 ms or more.

The average response speed of the TN-type liquid crystal molecules that change from black to a target gray value may be faster than that of the TN-type liquid crystal molecules that change from white to a target gray value.

Consequently, according to an exemplary embodiment of the present invention, the left eye image or the right eye image is displayed after displaying black on the screen of the TN-type liquid crystal display rather than displaying the left eye image or the right eye image after displaying white on the screen thereof.

Further, when over-shoot driving or under-shoot driving is applied to the liquid crystal display, according to an exemplary embodiment of the present invention, the visibility of a moving picture may be improved due to the improvement of the response speed of the liquid crystal molecules.

Further, when inversion driving is applied to the liquid crystal display, according to an exemplary embodiment of the present invention, Vc+Vr may be applied to the liquid crystal display as the common voltage Vcom so that the positive data voltage and the negative data voltage are changed into positive black data voltage.

Alternatively, Vc−Vr may be applied to the liquid crystal display as the common voltage Vcom so that the positive data voltage and the negative data voltage are changed into the negative black data voltage.

Alternatively, Vc+Vr and Vc−Vr may be alternately applied to the liquid crystal display as the common voltage Vcom so that the positive data voltage is changed into the positive black data voltage and the negative data voltage is changed into the negative black data voltage.

For example, when Vc is about 5V, the positive black data voltage may be about 10V, the negative black data voltage may be about 0V, and Vr may be about 10V.

The common voltage Vcom may be about 15V or about −5V while the voltage reset signal Vcom Reset is at a high level.

In the liquid crystal display, according to an exemplary embodiment of the present invention, the time when the data voltage is charged in the entire display panel 100 may be similar to the time when the voltage reset signal Vcom Reset is maintained at a high level.

For example, the time when the black data voltage is charged in the plurality of pixels 103 in the display panel 100 may be about 0.5 ms and the time when the voltage reset signal Vcom Reset is maintained at a high level may be about 0.5 ms.

In detail, in the VB interval, the high-voltage common voltage Vcom may be applied for about 0.5 ms before the left eye image data or the right eye image data is input and black may be displayed by the plurality of pixels 103.

For example, in the 3D image display device, according to an exemplary embodiment of the present invention, having a frame frequency of 120 Hz, one frame time may be about 8.3 ms, the time when the voltage reset signal Vcom Reset is maintained at the high level may be about 0.5 ms, the state in which the left eye shutter or the right eye shutter is open may be maintained for about 7.83 ms, and the backlight unit 200 may be turned-on for about 7.83 ms.

Accordingly, the crosstalk between the left eye image and the right eye image may be reduced and the luminance of the display panel 100 seen through the shutter member 300 may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three dimensional image display device, comprising:
    a display panel that alternately displays a left eye image and a right eye image,
    wherein a common voltage synchronized with a voltage reset signal is applied to the display panel and the voltage reset signal is maintained at a high level for a predetermined time before the left eye image or the right eye image is input,
    wherein the common voltage is a first voltage in which a reset voltage is added to a reference common voltage a first time the voltage reset signal is at the high level and the common voltage is a second voltage in which the reset voltage is subtracted from the reference common voltage a second time the voltage reset signal is at the high level,
    wherein a gate-on voltage is simultaneously applied to a plurality of gate lines while the voltage reset signal is maintained at the high level,
    wherein the three dimensional image display device further includes a gate-on voltage switching unit that simultaneously applies the gate-on voltage to the plurality of gate lines in response to the voltage reset signal having the high level being input to the gate-on voltage switching unit,
    wherein the gate-on voltage switching unit comprises a first output terminal and a second output terminal, the first output terminal is directly connected to the plurality of gate lines, the second output terminal is directly connected to a gate driver, and the gate-on voltage is simultaneously applied to the plurality of gate lines via the first output terminal.

2. The three dimensional image display device of claim 1, wherein:
    the first voltage or the second voltage as the common voltage is maintained at a high level while the voltage reset signal is maintained at the high level.

3. The three dimensional image display device of claim 1, wherein the gate-on voltage is sequentially applied to the plurality of gate lines while the voltage reset signal is maintained at a low level.

4. The three dimensional image display device of claim 1, wherein a left eye shutter maintains an open state from a time when an input of the left eye image starts to a time when an application of a first pulse of the voltage reset signal starts, and a right eye shutter maintains an open state from a time when an input of the right eye image starts to a time when an application of a second pulse of the voltage reset signal starts, based on a 3D sync signal.

5. The three dimensional image display device of claim 4, wherein the right eye shutter maintains a closed state from a time when an application of a third pulse of the voltage reset signal starts to a time when an application of a first pulse of the voltage reset signal ends and the left eye shutter maintains a closed state from a time when an application of the first pulse of the voltage reset signal starts to a time when an application of a second pulse of the voltage reset signal ends, based on the 3D sync signal.

6. The three dimensional image display device of claim 1, further comprising:
a backlight unit,
wherein the backlight unit is turned-on from a time when an input of the left eye image starts to a time when an application of a first pulse of the voltage reset signal starts, and
the backlight unit is turned-on from a time when an input of the right eye image starts to a time when an application of a second pulse of the voltage reset signal starts.

7. The three dimensional image display device of claim 6, wherein the backlight unit is turned-off for a time when the voltage reset signal is maintained at the high level.

8. The three dimensional image display device of claim 1, wherein the display panel displays black for a predetermined time.

9. The three dimensional image display device of claim 1, wherein the predetermined time is about 0.5 ms or less.

10. The three dimensional image display device of claim 1, further comprising:
a common voltage switching unit that switches the common voltage based on the voltage reset signal.

11. A method of driving a three dimensional display device, the method comprising:
alternately displaying a left eye image and a right eye image in a display panel; and
applying a common voltage synchronized with a voltage reset signal to the display panel,
wherein the voltage reset signal is maintained at a high level for a predetermined time before the left eye image or the right eye image is input,
wherein the common voltage is a first voltage in which a reset voltage is added to a reference common voltage a first time the voltage reset signal is at the high level and the common voltage is a second voltage in which the reset voltage is subtracted from the reference common voltage a second time the voltage reset signal is at the high level,
wherein a gate-on voltage is simultaneously applied to a plurality of gate lines while the voltage reset signal is maintained at the high level,
wherein the gate-on voltage is simultaneously applied to the plurality of gate lines by a gate-on voltage switching unit when the voltage reset signal having the high level is input to the gate-on voltage switching unit,
wherein the gate-on voltage switching unit comprises a first output terminal and a second output terminal, the first output terminal is directly connected to the plurality of gate lines, the second output terminal is directly connected to a gate driver, and the gate-on voltage is simultaneously applied to the plurality of gate lines via the first output terminal.

12. The method of claim 11, wherein the first voltage or the second voltage as the common voltage is maintained at a high level while the voltage reset signal is maintained at the high level.

13. A three dimensional (3D) image display device, comprising:
a display panel that alternately displays a first eye image and a second eye image,
wherein after the first eye image is displayed and before the second eye image displayed, a common voltage of a first level is applied to the display panel for a predetermined time, wherein the first level of the common voltage causes about the entire display panel to display black for the predetermined time,
wherein the common voltage is a first voltage in which a reset voltage is added to a reference common voltage a first time a voltage reset signal is at a high level and the common voltage is a second voltage in which the reset voltage is subtracted from the reference common voltage a second time the voltage reset signal is at the high level,
wherein a gate-on voltage is simultaneously applied to a plurality of gate lines while the voltage reset signal is at the high level,
wherein the 3D image display device further includes a gate-on voltage switching unit that simultaneously applies the gate-on voltage to the plurality of gate lines in response to the voltage reset signal having the high level being input to the gate-on voltage switching unit,
wherein the gate-on voltage switching unit comprises a first output terminal and a second output terminal, the first output terminal is directly connected to the plurality of gate lines, the second output terminal is directly connected to a gate driver, and the gate-on voltage is simultaneously applied to the plurality of gate lines via the first output terminal.

14. The 3D image display device of claim 13, wherein the first level of the common voltage is maintained for the predetermined time by the voltage reset signal.

15. The 3D image display device of claim 14, Wherein the first level of the common voltage is changed to a second level by the voltage reset signal immediately before the second eye image is displayed, wherein the second level causes about the entire display panel to stop displaying black.

* * * * *